J. O. NEIKIRK.
SHAFT OPERATING MECHANISM.
APPLICATION FILED FEB. 24, 1913.
1,125,033.
Patented Jan. 12, 1915.
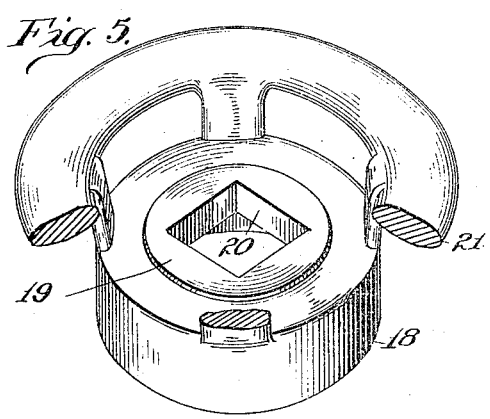
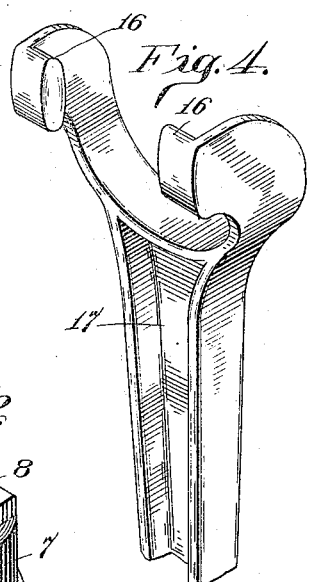
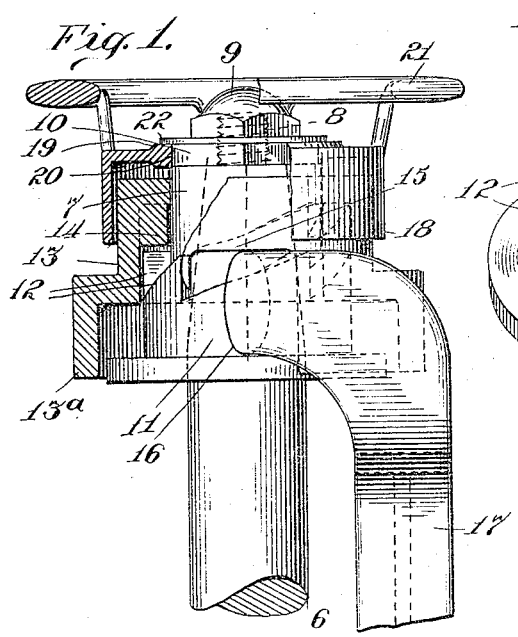
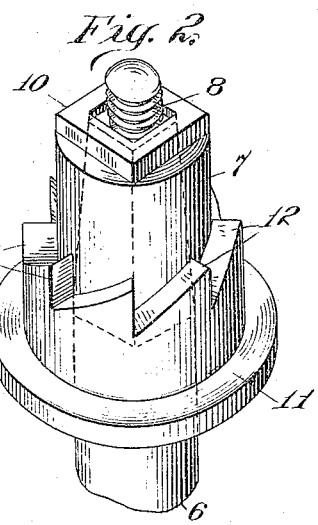
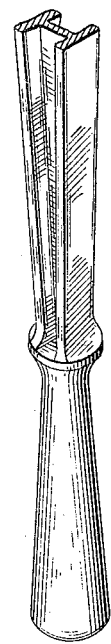
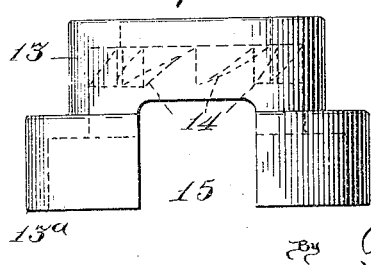

UNITED STATES PATENT OFFICE.

JOHN O. NEIKIRK, OF CHICAGO, ILLINOIS, ASSIGNOR TO HERCULES EQUIPMENT COMPANY, OF CHICAGO, ILLINOIS, A CORPORATION OF ILLINOIS.

SHAFT-OPERATING MECHANISM.

1,125,033. Specification of Letters Patent. Patented Jan. 12, 1915.

Application filed February 24, 1913. Serial No. 750,082.

*To all whom it may concern:*

Be it known that I, JOHN O. NEIKIRK, a citizen of the United States, and a resident of Chicago, county of Cook, and State of Illinois, have invented certain new and useful Improvements in Shaft-Operating Mechanism, of which the following is a description, reference being had to the accompanying drawing, which forms a part of my specification.

My invention relates to a mechanism intended for use in the operation of a ratchet hand brake, and has for its object the provision of means whereby the brake staff may be operated in either direction.

In the drawing:—Figure 1 illustrates my improved mechanism in side elevation with portions broken away at one side of the mechanism being shown in inoperative position construction; the primary portion of the mehanism being shown in inoperative position. Fig. 2 is a perspective view of the shaft or staff engaging member of the mechanism. Fig. 3 is a side elevation of the intermediate portion or loosely mounted interlocking member of the mechanism. Fig. 4 is a perspective view of the operating lever with a portion intermediate of the ends broken away. Fig. 5 is a perspective view, with portions broken away, of the auxiliary operating means, looking at the same from the top side thereof.

In the form of my invention, as illustrated in the drawing, the brake staff or shaft is designated by the reference numeral 6; the lower end of the staff, about which the end of the brake chain is usually wound, as well as the usual locking ratchet and detent or pawl, being omitted because they form no part of my invention. The upper end of the shaft or staff 6 is preferably tapered and squared as shown in dotted lines, see Figs. 1 and 2, in order that it may receive the hub or cylindrical portion of shaft engaging member 7, which is provided with a tapering squared opening passing therethrough, to receive the tapered square end of the shaft or staff 6; the upper end of the shaft or staff being preferably screw threaded, as shown at 8, see Fig. 2. The threaded end 8 is adapted to receive the fastening nut 9, see Fig. 1, whereby the various parts or portions of my improved mechanism are maintained in place on the staff or shaft and in proper relation with each other.

The upper end of the cylindrical portion of shaft engaging member 7 is provided with a squared end or shoulder as shown at 10, see Fig. 2, while the lower end of the member 7 is provided with an annular flange 11, above which are provided the circumferentially arranged teeth 12, presented upwardly as more clearly shown in Fig. 2. From the construction shown and described, it is apparent that member 7 is intended to rotate with the shaft or staff 6.

Loosely mounted on cylindrical or hub portion of the staff engaging member 7 is an intermediate or interlocking, inverted cup-shaped member 13, see Figs. 1 and 3; the lower or skirt portion of member 13 being off-set or of greater diameter than the upper portion, as shown at 13ª, in order that the lower end or skirt portion of member 13 may encircle flange 11 of shaft engaging member 7, as clearly shown in Fig. 1; the inwardly presented shoulder produced by the off-set or skirt portion 13ª being intended to rest on or come into close proximity to the flange 11 of staff or shaft engaging member 7 when the members are in an interlocking or operative position induced by the position of the operating lever. The inner surface of the upper portion of intermediate member 13 is provided with the circumferentially arranged and downwardly presented teeth as shown in dotted lines at 14, see Fig. 3. These teeth 14 are so constructed as to interlock or engage with the teeth 12 on the staff engaging member 7, when the mechanism is in operative position. The intermediate or interlocking member 13 is provided with openings or cut-out portions, as clearly shown at 15, Fig. 3, preferably arranged diametrically opposite each other; the cut-out portions or openings being in the lower or flared portion of member 13 at a point slightly beneath the downwardly presented tips of teeth 14.

The openings or cut-out portions 15 of intermediate or interlocking member 13 are intended to receive the inwardly presented lugs or portions 16 arranged on the bifurcated end of lever or operating handle 17, the construction whereof is clearly set forth in Fig. 4. The lugs or portions 16 correspond with the width of the bifurcated portion of lever or handle 17, thus producing elongated lugs, of greater dimensions transversely of the bifurcated portion of the lever than in the opposite or vertical direction when the lever is held in a horizontal or operative position; the length or greater dimension of the lugs being substantially equal to or slightly greater than the distance from the flange 11 on member 7 to the tips of teeth 12; while the shorter dimension or width of the lugs 16, and which will be the vertical dimensions of the lugs 16 when the lever is in operative position, is preferably less than the distance between flange 11 and the lower portion of the teeth 12 on member 7. The cut-out portions or openings 15 in member 13 are of a width sufficient to receive lugs 16 and enable handle or lever 17 to be raised into a horizontal or operative position.

From the construction shown and described, it is evident that when lever 17 is raised into a horizontal or operative position, the lugs 16 will be so arranged as to present their length in a horizontal direction or parallel with flange 11, thus allowing intermediate or interlocking member 13 to drop downwardly by reason of the cut-out portions 15, thereby bringing the teeth 14 of member 13 into engagement with the teeth 12 on the staff engaging member 7. The intermediate or interlocking member 13 will, of course, maintain handle or lever 17 in proper position on flange 11 because of the fact that the lugs 16 are presented inwardly and through the cut-out portions or openings 15, thus preventing removal of handle or lever 17 without the removal of interlocking member 13. The upper or cylindrical portion of staff engaging member 7 is of sufficient length to permit the intermediate or interlocking member 13 to move freely upward and allow the teeth 14 to ride over teeth 12 when lever 17 is moved in a reverse direction. The relative positions of the parts heretofore described are maintained in their proper relation by the cap member 18, which is adapted to fit about the upper portion of the intermediate member 13 and to be suitably secured thereto as clearly shown in Fig. 1.

It is desirable in devices of this kind that some means be provided to produce an initial slack in the brake mechanism when the brakes are released. Under ordinary conditions, this slack does not occur until the train has run for some distance when the brakes become slackened owing to the vibration produced by the running of the car. In order to provide a positive means for producing immediate slack in the brake mechanism when the brakes are released, the cap 18 is shown provided with a centrally arranged enlarged portion or boss 19 provided with a squared opening 20 which is adapted to fit over or receive the squared end or shoulder 10 arranged on the upper end of staff engaging member 7, so that cap 18 will be compelled to move in unison with staff engaging member 7, or vice versa. Cap 18 is provided with a hand wheel 21 of suitable construction, by means of which the shaft may be turned. By thus providing cap 18 with the hand-wheel 21 and having the cap operatively connected with staff engaging member 7, it is evident that movement may be given to the shaft or staff, through member 7, which is fixedly secured on the staff independently of operating lever 17 and intermediate or interlocking member 13.

In the usual operation of my mechanism, when it is desired to rotate shaft or staff 6, to apply the brakes, handle or lever 17 is lifted from the position shown in Fig. 1 into a horizontal position. Such movement of lever 17 will move the projections or lugs 16, at the bifurcated end of lever 17, into a position where their greatest dimension will extend substantially parallel with flange 11, thus allowing intermediate or interlocking member 13 to drop downwardly and bring its teeth or engaging surfaces 14 into engagement with the engaging surfaces or teeth 12 of member 7. By reason of the fact that handle or lever 17 occupies a vertical position, substantially parallel with the brake staff or shaft to be operated, when in an inoperative position, it is evident that lever 17 may be made of considerable length so as to afford great leverage for the purpose of applying the brakes, without necessitating a brake operating device wherein a portion would extend into the path of objects passing or to be passed. After the brakes have been applied, handle or lever 17 is released and allowed to swing or drop downward, through the action of gravity, into the position shown in Fig. 1, that is, into a position substantially parallel with the staff or shaft and, therefore, out of the way of objects that may pass or are being passed by the car on which the mechanism is located. By reason of the elongated or cylindrical portion of member 7 and the construction of the inwardly presented portions or lugs 16 on handle 17, the downward movement or dropping of handle or lever 17 will move intermediate or interlocking member 13 upward and thereby automatically produce an inoperative relation between member 13 and staff engaging member 7. The brakes having been thus applied, the parts are under tension, and this tension is not immediately released with the release of the brakes under ordinary conditions as before described. In order to provide for the immediate release of the tension and for a slack in the brake mechanism, the usual ratchet engaging pawl secured at the lower end of the staff is disengaged from the ratchet in the customary manner. The hand wheel 21 may then be employed to turn the staff so as to unwind the brake chain to an extent sufficient to produce the desired slack. It is evident also that if anything should occur to prevent the proper operation of the ratchet device between members 7 and 13, the hand wheel may be employed to operate the staff and thus act as an auxiliary staff or shaft operating means.

I have shown and described what I believe to be the simplest and best form of my invention, but the same may be modified in certain details without, however, departing from the spirit of my invention.

What I claim is:—

1. Shaft operating mechanism, comprising a member fixedly mounted on the shaft to be operated, a second member secured about the upper end of said first mentioned member and having positive engagement against rotation thereon whereby the shaft may be rotated in the opposite direction, an intermediate cup-shaped member adapted to be moved into and out of operative relation with the first mentioned member, and a lever having controlling relation with the intermediate member whereby the intermediate member is moved into and out of operative relation with the first mentioned member.

2. Shaft operating mechanism, comprising a member fixedly connected to the shaft or staff to be operated, a second member secured about the upper end of the first mentioned member and having positive engagement therewith so as to permit rotation of the shaft thereby, an intermediate member loosely mounted on the first member and adapted to move into and out of operative relation therewith, and an operating handle or lever loosely mounted on the first member whereby the position of the intermediate member is controlled.

3. Shaft operating mechanism, comprising a member fixedly mounted on the staff or shaft to be operated, a second member loosely mounted on and extending about the first member, said second member being adapted to move vertically into and out of operative relation with the first member, a lever loosely mounted on the first member and arranged to control the position of the second member, and a third member mounted above the second member and having positive engagement with the staff or shaft whereby the latter may be operated.

4. Shaft operating mechanism, comprising a member fixedly secured to the staff or shaft to be operated, said member being provided with a flange at its lower end and with engaging surfaces intermediate of said flange and the opposite end of said member, a second member slidably mounted on the upper end of said first member and provided with surfaces adapted to interlock with the engaging surfaces of the first mentioned member, a lever slidably mounted on the flange of said first mentioned member and arranged to control the position of said second mentioned member so as to move the engaging surfaces of the two members into and out of operative relation, and a third member having a fixed relation to the staff or shaft whereby the elements of said mechanism are maintained in place and the staff or shaft may be given movement independent of the other elements of said mechanism.

5. The combination of a staff or shaft having a ratchet member mounted thereon and provided with a flange below said ratchet member, a second member slidably mounted above said ratchet member and provided with surfaces adapted to engage with the ratchet when moved in one direction, a drop handle or lever loosely mounted on the flange so as to permit it to rotate thereon during the operation of said shaft or staff, said handle or lever being loosely held in place on the flange by said second member, and a third member mounted above the second member and having positive relation with the staff or shaft whereby the latter may be given movement independent of said handle or lever.

6. Shaft operating mechanism, comprising a flanged member fixedly secured to the shaft or staff to be rotated, said member being provided with engaging surfaces above the flanged portion thereof, a second member loosely mounted on the flanged member and having engaging surfaces adapted to interlock with the engaging surfaces of the flanged member, said second member being provided with openings in the side walls thereof and adapted to move lengthwise of the shaft, a bifurcated lever having inwardly presented ends extending through the openings in the second member and onto the flanged portion of the first mentioned member, said inwardly presented portions being so arranged that the engaging surfaces of the two members will interlock when the lever is swung into operative position, and a third member having positive engagement with the flanged member whereby the staff or shaft may be given movement independent of said lever.

7. Shaft operating mechanism, comprising a cylindrical member having a flange at one end thereof and upwardly presented engaging surfaces at a point intermediate of the flange and the opposite end of said member, said member being fixedly secured to the shaft or staff to be rotated, a second member extending about the cylindrical member and slidably mounted intermediate of the engaging surfaces and one end of said member, said second member being provided with internally arranged engaging surfaces adapted to interlock with the upwardly presented engaging surfaces of the cylindrical member, said second member having openings in the side walls thereof at points opposite each other, a bifurcated lever having inwardly presented ends or lugs arranged to extend through the openings in the side walls of the second member and rest on the flange of the cylindrical member, said inwardly presented ends or lugs being arranged to control the position of the second member when said lever is moved into or out of operative position, and a third member having fixed relation with the staff or shaft to be operated whereby the latter may be given movement independent of said lever.

8. Shaft operating mechanism, comprising a ratchet member adapted to be fixedly secured to the staff or shaft to be rotated, said ratchet member having an annular flange at a point beneath the ratchet portion thereof and a cylindrical end above said ratchet portion terminating in a shoulder, a second member arranged to fit about said shoulder whereby movement to the staff and shaft may be given, an intermediate member slidably mounted about the ratchet member and provided with an internally arranged ratchet adapted to interlock with said ratchet member, and a lever arranged to drop into a position parallel with the shaft or staff to be rotated, the end of the lever being arranged to rest on said annular flange of the ratchet member and held in place by the intermediate member whereby movement of said lever will control the relation between the ratchet member and the intermediate member and the staff or shaft operated.

9. Shaft operating mechanism, comprising a pair of concentrically arranged ratchet members, one of which is fixedly secured to the shaft or staff to be rotated while the other is adapted to have movement lengthwise of the shaft so as to move into and out of operative relation with the fixed member, a lever having portions extending through the wall of the outer member and loosely mounted on the inner member so as to permit the lever to drop into a position substantially parallel with the shaft and move the outer member out of engagement with the inner member, and a third member having positive engagement with the inner or fixedly mounted member whereby the staff or shaft may be rotated independent of said lever.

10. Shaft operating mechanism, comprising a pair of concentrically arranged ratchet members, the inner member being fixedly secured to the shaft or staff to be rotated and provided with an annular flange at its one end and a squared portion or shoulder at the other end, the outer member being provided with openings in the side wall thereof coincident with the distance between the annular flange and the tips of the ratchet or teeth of said inner member, a bifurcated lever having elongated lugs or portions at the ends of the bifurcations presented toward each other, the said lugs or portions being arranged to extend through the openings in the outer member and rest on the annular flange of the inner member so that the lever may move into a position at right angles to the staff or shaft or substantially parallel with the staff or shaft, and a third member arranged to receive the squared portion or shoulder of the inner member so that movement may be given to the staff or shaft independent of said lever.

11. A hand brake, comprising ratchet mechanism for turning the brake staff in one direction, consisting of a cylindrical member fixedly secured to the staff and provided with a ratchet portion, a second member secured about the first member and movable vertically thereon and provided with a ratchet portion adapted to move into engagement with the ratchet portion of the first member, and a lever loosely mounted on the first member and adapted to control the position of the second member when the lever is moved into a position substantially at right angles to the staff, and independent means having operative connection with the staff for turning the brake staff in the opposite direction.

JOHN O. NEIKIRK.

Witnesses:
GEORGE HEIDMAN,
R. E. WIGHTON.

Copies of this patent may be obtained for five cents each, by addressing the "Commissioner of Patents, Washington, D. C."